Figure 1:
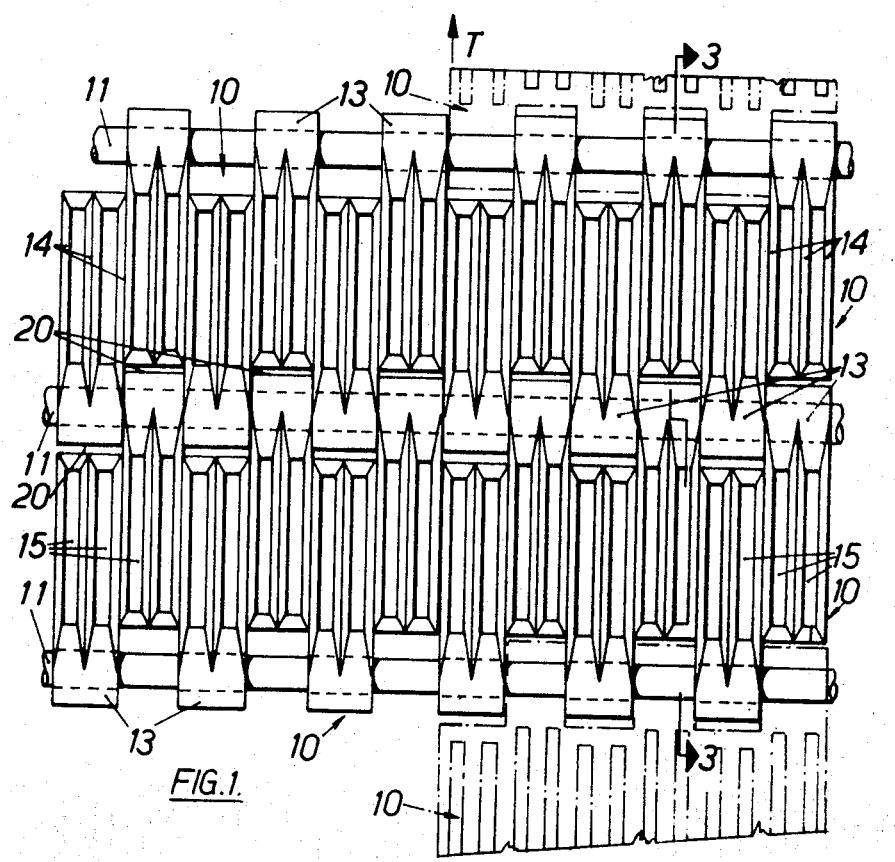

United States Patent [19]
Harvey

[11] 3,774,752
[45] Nov. 27, 1973

[54] ENDLESS BAND CONVEYORS

[76] Inventor: George Arthur Harvey, 23 Wannerton Rd., Blakedown, England

[22] Filed: Nov. 16, 1971

[21] Appl. No.: 199,165

[52] U.S. Cl. .............................................. 198/195
[51] Int. Cl. ............................................. B65g 15/30
[58] Field of Search ................... 198/195, 189, 16, 198/17, 18; 263/8 R

[56] References Cited
UNITED STATES PATENTS

| 2,987,168 | 6/1961 | Franz | 198/195 |
| 3,669,247 | 6/1972 | Pulver | |
| 3,191,743 | 6/1965 | Rissler | 198/16 |
| 3,651,924 | 3/1972 | Homeier | 198/189 |

Primary Examiner—Richard E. Aegerter
Attorney—Solon B. Kemon et al.

[57] ABSTRACT

An endless band conveyor in which the load-bearing components of the band are cast or moulded modules each having a generally tabular, grating-like structure with portions at opposite sides at which the modules are hingedly connected to spaced transverse rod members of the band.

8 Claims, 6 Drawing Figures

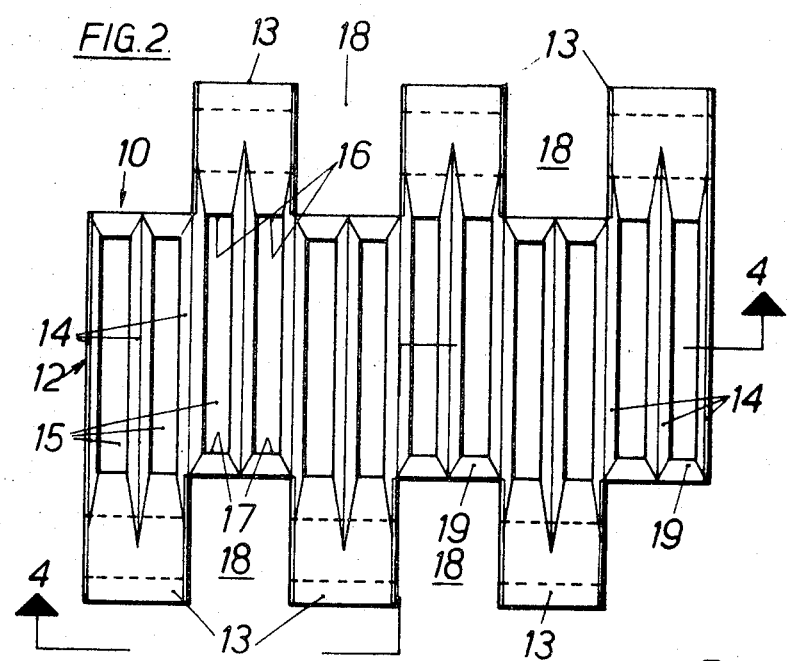
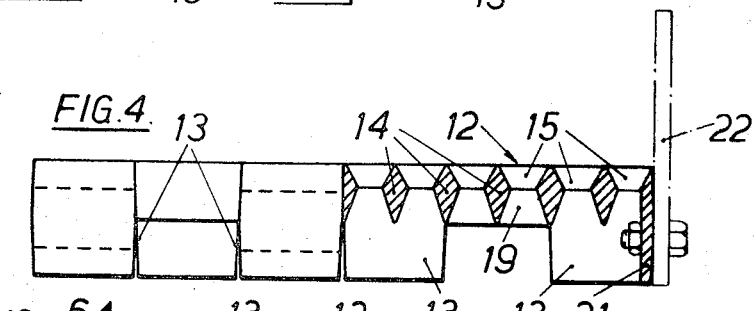
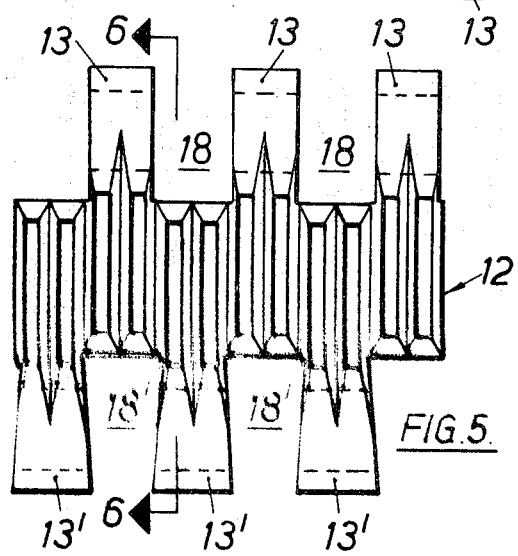
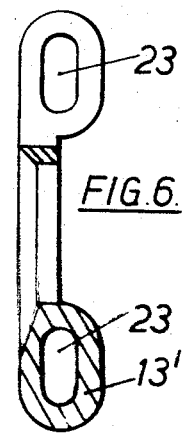

ENDLESS BAND CONVEYORS

This invention relates to endless band conveyors of the kind in which the band is constructed of load-bearing components hingedly connected to and extending between spaced rod members which extend transversely of the direction of travel of the conveyor band. Such endless conveyor bands are hereinafter referred to as "of the kind described."

The load-bearing components of the conveyor bands of the kind described have hitherto generally been formed out of wire, or sheet or plate metal, worked to shape. Inaccuracies and inconsistences in shape and size do occur in such components which can give rise to difficulties in the initial assembly of the components and when broken or worn parts are subsequently to be replaced. These inaccuracies and inconsistences can also promote wear and breakdowns in the conveyors, and increase the loading on the drives of the conveyors. In many applications of use the conveyor bands are required to be perforate, for example for the purpose of drainage, and to provide entirely flat supporting surfaces for the articles they are to carry. This cannot readily be achieved with the known metal conveyor components, and undesirable consequences can result where in some applications of the conveyors it is an essential prerequisite to the satisfactory working and treating of articles carried along by the conveyor bands that the articles should be supported squarely on the conveyor bands. Another disadvantage of the known metal components is that the strength of the components can be impaired by the fact that they have to be worked to shape, with consequent failures in use and breakdowns of the conveyor bands. Yet another disadvantage is that the components are limited in the forms that they can take.

An aim of the present invention is to provide an endless conveyor band of the kind described in which at least some of the disadvantages set forth of the known bands are avoided.

Thus according to one aspect of the present invention there is provided an endless conveyor band of the kind described wherein the load-bearing components are modulated plastics modules disposed in transverse rows across the band, and each module has a perforate body of generally tabular form presenting a flat load-supporting surface, and at opposite sides of and integral with said body hinge portions of eye form through which the transverse rod members pass, and which project from said body longitudinally of the band and below the level of said load-supporting surface, said hinge portions presented by said modules in each said transverse row at one side of said transverse row being spaced apart by distances complementary to the widths, that is the dimensions measured transversely of the band, of said hinge portions presented by said modules at the opposite side of said transverse row, and said hinge portions of said modules in each said transverse row fitting between, and engaging the same transverse rod members as, said hinge portions of said modules in adjacent transverse rows. As the modules are moulded their shapes can be very accurately formed and defined. This facilitates initial assembly of the conveyor and subsequent replacement of the components of the conveyor. With the moulded modules now provided flat supporting surfaces in the modules themselves may be achieved without difficulty, and, because of the consistent accuracy of shape and dimensions which can be achieved, the surfaces of the modules can together present an overall supporting surface which is uniformly flat too.

The perforate body of each module ensures good drainage away from the module and enables passage of air through the module. The body may have a series of elongated slots in it. Such an arrangement is suitable for a wide range of uses of the conveyor but in some instances it may be desirable for the perforations of the body to be presented in some other more appropriate way. The slots may extend partially over the hinge portions of at least one side of the module.

The body of each module may be formed with a series of spaced bar portions the spaces between which provide the slots. The bar portions will normally extend parallel to one another to define a grating-like structure. Such an arrangement considerably reduces the flat surface area of the module and ensures good drainage when the conveyor band is used to carry wet articles. Where drainage is important the bar portions preferably taper in cross-section towards their support surfaces, and they may taper to such an extent that the supporting surface of each bar is, or is little more than, a line. The supporting surfaces of the bars preferably all lie in the same flat plane. It may be desirable in other instances also for the bar to be so tapered to allow and encourage matter to pass easily away from the supporting surface.

Conveniently the spaced hinge portions at one side of the modules are staggered with respect to the hinge portions at the opposite side. Thus in the made-up band successive modules of similar form can be aligned with one another with the hinge portions intercalating at the hinged connections with the transverse rod members.

Those modules which are at the ends of each transverse row of the modules may have at their outer edges, which form the side edges of the conveyor band, fixing flange portions to which side wall members may be secured along the sides of the band the side wall members projecting upwards above the level of the top surfaces of the modules. These fixing flange portions may be provided on the undersides of the modules at their edges and serve also to stiffen the modules longitudinally.

A further object of the invention is to provide a conveyor band which is capable of travelling a sinuous path. To this end there is provided an endless conveyor band or the kind described wherein the load-bearing components are moulded plastics modules disposed in transverse rows across the band, and each module has a body of generally tabular form presenting a flat load-supporting surface, and at opposite sides of and integral with said body hinge portions of eye form having oval apertures through which the rod members pass, the major diameter of each said oval aperture extending longitudinally of the band and the minor diameter thereof being complementary to the diameters of the rod members, said hinge portions of said modules projecting from said bodies longitudinally of the band and those of said hinge portions which are at one side of said bodies being parallel-sided, that is to say side faces of said hinge portions through which said apertures open are parallel to one another, and those of said hinge portions which are at the opposite side of said bodies have flared sides through which said apertures open, the flare being in the direction away from said bodies, and said modules in said transverse rows of modules being disposed with said parallel-sided hinge portions fitting between, and engaging the same transverse rod members as, said flared-sided hinge portions of said modules in adjacent transverse rows.

Conveyor bands in accordance with the invention have a wide range of applications, and are particularly suitable for the situations where accuracy of shape and form of their load-bearing components is essential. There are other instances where they are a distinct advantage over the conventional conveyors. For example the conveyors are very suitable for the food industry. Because they are plastics the modules can be kept clean fairly easily, they do not suffer from problems of corrosion, rusting and the like to which metal components are susceptible, and they are altogether far more hygienic to use than the known metal load-bearing components of conveyors. Furthermore this can be achieved at appreciably less cost than would be incurred if it was attempted to try to obtain a conveyor of all metal components which was in any way comparable in its hygienic qualities. Another advantage of using plastics modules is that it is possible to provide belts which are lighter than ones comprised of metal components, with consequent reduction in the drag on the driving gear, and thus the possibility of fewer breakdowns.

According to another aspect of the present invention there is provided a load-bearing component for an endless conveyor band, comprising a moulded plastics module having a perforate body of generally tabular form presenting a flat load-supporting surface, and at opposite sides of and integral with said body spaced hinge portions of eye form for receiving transverse rod members of the conveyor band, said hinge portions projecting laterally from said body sides below the level of said load-supporting surface, and said hinge portions at each side of said body being spaced apart by distances complementary to the widths, that is the dimensions parallel to said body sides, of said hinge portions of the other side of said body.

According to yet another aspect of the invention there is provided a load-bearing component for an endless conveyor band, comprising a moulded plastics module having a body of generally tabular form presenting a flat load-supporting surface, and at opposite sides of and integral with said body spaced hinge portions of eye form having oval apertures adapted to receive transverse rod members of the conveyor band, the major diameters of said apertures extending at right angles to said body sides and parallel to said load-supporting surface, and the minor diameters of said apertures being complementary to the diameters of the rod members which said apertures are adapted to receive, said hinge portions projecting laterally from said body sides and those of said hinge portions which are at one side of said body being parallel-sided, that is to say side faces of said hinge portions through which said apertures open are parallel to one another, and those of said hinge portions which are at the opposite side of said body have flared sides through which said apertures open, the flare being in the direction away from said body, and said parallel-sided hinge portions being spaced apart by distances complementary to the widths, that is the dimensions parallel to said body sides, of said flared-sided hinge portions.

Figure 3:
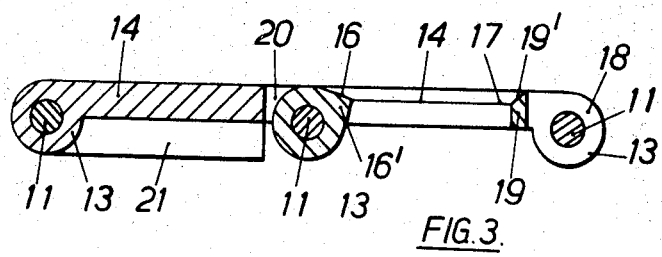

Embodiments of the invention will now be described by way of example with reference to the accompanying drawings in which:

FIG. 1 is a plan view of part of a conveyor band in accordance with the invention, FIG. 2 is a plan view of a module included in the part of the band shown in FIG. 1, FIG. 3 is a section on line 3—3 of FIG. 1, FIG. 4 is a section on line 4—4 of FIG. 2, FIG. 5 is a plan view of an alternative form of module, and FIG. 6 is a section on line 6—6 of FIG. 5.

The conveyor band of which a part is shown in FIG. 1 is composed of load-bearing modules 10 moulded from plastics (for example glass reinforced nylon) which are hingedly connected to and extend between spaced rods 11 which extend transversely of the direction of travel of the conveyors band indicated by arrow T. Between each adjacent pair of rods 11 there is a row of the modules 10 disposed side-by-side with one another across the width of the conveyor band.

Each module 10, as can be seen most clearly in FIG. 2, is of basically tabular form. It has an oblong rectangular body part 12 disposed so that its longest dimension extends transversely of the conveyor band, that is transversely of the direction of travel of the band. Projecting from and integral with the longer sides of the body part 12 are co-axial, equally spaced eye portions 13 through which the rods 11 pass, thereby hingedly connecting the module to the rods. Externally the eye portions are generally cylindrical. Their circumferential walls are imperforate. The eye portions 13 at each side of the body part 12 are spaced apart by distances very slightly larger than the widths of the eye portions; the width of each eye portion being its dimension measured transversely of the conveyor band axially of the eye. The eye portions 13 at one side of the body part 12 are staggered with respect to those at the opposite side of the body part. Hence, as shown in FIG. 1, the eye portions of successive, aligned, modules 10 along the length of the conveyor band are able to intercalate at their hinged connections with the rods 11. As the eye portions 13 of the modules which engage each rod 11 fit closely together they form in effect in combination a continuous sleeve which covers the rod across the width of the band.

The external diameter of each eye portion 13 is approximately twice as large as the thickness of the body part 12, as can be seen in FIG. 3. The eye portions 13 are so formed with respect to the body part that the top surface of the body lies in a plane tangential to the top of the curvature of the cylindrical surface of the upper half of each eye portion, and the lower half of each eye portion depends below the level of the bottom surface of the body part.

The body part 12 of each module 10 is formed as a series of equally-spaced parallel bars 14 which extend in the direction of travel of the conveyor band and are of kite-shaped cross-section, as shown in FIG. 4. The bars 14 give the body part 12 a grating-like appearance in plan. The top surfaces of the bars all lie in a common, flat plane.

Between the bars 14 elongated slots 15 are defined. The slots 15 are in staggered pairs, there being one pair of slots 15 opposite each eye portion. Only at their one end 16, FIGS. 2 and 3, are the slots 15 of each pair directly opposite an eye portion 13, their opposite ends 17 being disposed opposite a recess 18 between two adjacent eye portions. The ends 16 of the slots 15 of each pair opposite an eye portion 13 are extended over the eye portion as far as the top of the curvature of the cylindrical surface of the upper half of the eye portions. The end 16 of each slot 15 is closed by a triangular part 16', FIG. 3, of the wall of the eye portion 13, with the result that the slot at that end is longer at the top surface of the body part 12 than it is at the bottom surface of the body part. The end 17 of each slot 14 opposite the recess 18 between two eye portions 13 is closed off by a wall portion 19 of the body part 12, FIG. 3, extending between adjacent bars 14, and which has a bevelled upper part 19' with the bevel adjacent the slot so that at this end too the slot 14 is longer at the top surface of the body part than at the bottom surface. The wall portion 19 is spaced from the common axis of the adjacent eye portions 13 by a distance which is slightly greater than the external radius of the eye portions. A narrow slot-like gap 20 is therefore left between the wall portion 19 and the eye portion 13 of an adjacent module engaged in the recess 18 next to the wall portion. The wall portion 19 may alternatively be arcuately curved, its centre of curvature being on the common axis of the adjacent eye portions, but its minimum radius of curvature being greater than the external radius of the eye portions. Thus, in such an arrangement with the recess 18 between two eye portions 13 of the module occupied by an eye portion of an adjacent module, in the assembled conveyor band an arcuate gap is left between the curved wall portion 19 at the recess 18 and the cylindrical surface of the eye portion engaged in that recess.

The bars 14 as previously stated and as can be clearly seen in FIG. 4 have kite-shaped cross-sections. Because of this the bars present a very small surface area which is virtually only a line at the top of the body part 12 of each module. This together with the slots 15 ensures good drainage of liquid away from the module when the conveyor band is used to carry wet articles. The gaps 20 left between the wall portions 19 and the eye portions aid the drainage. In addition the slots 15 and the gaps 20 allow air to pass freely through the conveyor band.

On the underside of the body part 12 of each module there is at one of the two shorter sides thereof a depending stiffening flange 21, FIGS. 3 and 4. The flange 21 strengthens the module in the direction of travel of the conveyor band. It depends to the level of the bottom of the curvature of the cylindrical surface of the eye portion 13 with which it merges at one of its ends. The flanges 21 of the two modules at opposite ends of a row of modules extending across the width of the conveyor band may also serve as fixing flanges to which plates or like members as indicated at 22 in FIG. 4 may be bolted, or otherwise rigidly secured, which extend alongside the modules and project above the level of the top surface of the modules to provide side walls of the conveyor band. If desired, or necessary, there could be stiffening flanges at both of the shorter sides of each module, and in the case of the end modules the flanges which provide the fixing flanges for side wall plates or like members may be thicker than the other flanges.

For many applications of the conveyor it has been found to be convenient to have the transverse rods 11 spaced so that their axes are 50 m.m. apart. The modules thus have their eyes 13 at 50 m.m. centres. In one example in which the rods 11 are so spaced, the rods have a diameter of 7 m.m. The external diameter of the eyes 13 which receive those rods is 14 m.m. The width of each eye 13 and of each of the recesses 18 between the eyes is 12.5 m.m. The thickness of the rectangular body part 12 of each module in this particular example is 6 m.m., and the longer sides of the body part measure 75 m.m. and the shorter sides 33 m.m. It will be understood that the rods 11 may be spaced at other distances apart, if desired, and that the modules may have dimensions different from those mentioned.

In the embodiment described, because of the relative widths of the eye portions 13 and recesses 18 of adjacent modules of the assembled conveyor band, and the consequent close, without being tight, lateral engagement of the eye portions in the recesses, there is no, or virtually no, room for relative lateral movement between the modules. There is no room either for relative longitudinal movement of adjacent modules because the apertures of the eye portions 13 are large enough only to permit the rods 11 to pass through with just sufficient clearance to avoid binding. Hence in that embodiment the conveyor band is restricted to straight-line, or virtually straight-line, travel.

If a conveyor band is required which is able to travel along a sinuous path, modules of the alternative form shown in FIGS. 5 and 6 may be used in the construction of the band. As before, each module has an oblong rectangular body part 12 and spaced eye portions 13, 13' along the two longer sides of the body part with recesses 18, 18' respectively between them. The body part 12 is similar to that in the previously described embodiment and the arrangement of the eye portions 13, 13' is also similar. The difference lies in the forms of the eye portions 13, 13'.

As can be seen the eye portions 13, 13' instead of being substantially cylindrical are of substantially regular oval cross-section with oval cross-section apertures 23, the major diameter of the oval section extending in the direction at right angles to the adjacent longer sides of the body part and parallel to the plane of the supporting surface of the body part. As illustrated the major diameter of each aperture 23 is approximately twice as long as the minor diameter. The eye portions 13 at one side of the body part 12 are parallel-sided, that is to say the side faces of the eye portions through which the apertures 23 open and which are adjacent to the recesses 18 are parallel to one another, as can be seen in FIG. 5. The eye portions 13' at the other side of the body part have flared sides so that they are of symmetrical dove-tail shape in plan. At their widest parts the dove-tail eye portions 13' are spaced apart by distances slightly greater than the widths of the parallel-sided eye portions 13 to enable the parallel-sided eye portions of another similar module to be engaged in the recesses 18' between the dove-tail eye portions. The recesses 18 between the parallel-sided eye portions 13 are just wide enough to accommodate the dove-tail eye portions 13' of a similar module.

In the assembled conveyor band the oval section apertures 23 of the eye portions 13, 13' are engaged by round-section rods as before to hinge adjacent modules together. The rods are of complementary diameter to the minor diameter of the apertures 23. At the hinge between adjacent modules the parallel-sided eye portions 13 of one of the modules intercalate with the dovetail eye portions 13' of the other module. Because the apertures 23 with which the hinge rods engage are oval the modules are able to move relative to the rods and hence to one another in the longitudinal direction of the conveyor band. Furthermore the oval apertures 23 in combination with the intercalation of the dovetail eye portions 13' with the parallel-sided ones permit some relative angular movement between adjacent modules in a plane common to both modules, whilst avoiding undue relative movement between the modules transversely of the conveyor band. The relative movements permitted enables the conveyor band to travel along a sinuous path if required.

The two forms of module described and illustrated may be injection moulded in a two part mould the general parting line of which is at the plane of the underneath surface of plane common body part 12 of each module, although the mould half in which the lower halves of the eye portions 13, 13' are formed will have parts which project from that general line to define the lower sections of the slots 15 between the kite-shaped bars 14 of the body part. A general draft taper of the order of 3° is conveniently provided. Core pins define the apertures of the eye portions.

I claim:

1. An endless conveyor band constructed of spaced transverse rod members and load-bearing components extending between and hingedly connected to said rod members, wherein the improvement comprises said load-bearing components being moulded plastics modules disposed in transverse rows across said band, and each having a body of generaly tabular form presenting a flat load-supporting surface, and at opposite sides of and integral with said body hinge portions of eye form having oval apertures through which said rod members pass, the major diameter of each said oval aperture extending longitudinally of said band and the minor diameter thereof being complementary to the diameters of said rod members. said hinge portions of said modules projecting from said bodies longitudinally of said band and those of said hinge portions which are at one side of said bodies being parallel-sided, that is to say side faces of said hinge portions through which said apertures open are parallel to one another, and those of said hinge portions which are at the opposite side of said bodies have flared sides through which said apertures open, the flare being in the direction away from said bodies, and said modules in said transverse rows of modules being disposed with said parallel-sided hinge portions fitting between and engaging the same transverse rod members as, said flared-sided hinge portions of said modules in adjacent transverse rows.

2. An endless conveyor band according to claim 1 wherein each said module has a plurality of said parallel-sided and flared-sided hinge portions, said hinge portions being spaced apart and the spacing between said parallel-sided hinge portions being complementary to the widths, that is the dimensions measured transversely of said band, of said flared-sided hinge portions at their widest parts.

3. An endless conveyor band according to claim 1 wherein said hinge portions of each said module are disposed below the level of said load-supporting surface, and have integral depending parts extending below said body, and said body of each said module has at its underside at least one integral depending stiffening flange extending from side to side of said body longitudinally of said band and joined to said depending part of at least one of said hinge portions.

4. An endless conveyor band according to claim 1 wherein said body of each said module has a series of elongated slots therein extending longitudinally of said band, and which extend partially over said hinge portions.

5. A load-bearing component for an endless conveyor band, comprising a moulded plastics module having a body of generally tabular form presenting a flat load-supporting surface, and at opposite sides of and integral with said body spaced hinge portions of eye form having oval apertures adapted to receive transverse rod members of the conveyor band, the major diameters of said apertures extending at right angles to said body sides and parallel to said load-supporting surface, and the minor diameters of said apertures being complementary to the diameters of the rod members which said apertures are adapted to receive, said hinge portions which are at one side of said body being parallel-sided, that is to say side faces of said hinge portion through which said apertures open are parallel to one another, and those of said hinge portions which are at the opposite side of said body have flared sides through which said apertures open, the flare being in the direction away from said body, and said parallel-sided hinge portions being spaced apart by distances complementary to the widths, that is the dimensions parallel to said sides, of said flared-sided hinge portions.

6. An endless conveyor band constructed of spaced transverse rod members and load-bearing components extending between and hingedly connected to said rod members, wherein said load-bearing components are moulded plastics modules disposed in transverse rows across said band, there being a plurality of said modules in each said transverse row, and each module has a perforate body of generally tabular form comprising a series of spaced bar portions extending lengthwise of the band between which open slots are defined and which bar portions together present a flat supporting surface of said body, and integral with and projecting from opposite sides of said body lengthwise of said band spaced hinge portions of eye form through which said transverse rod members pass and partially over which said bar portions and slots extend, said hinge portions each having an imperforate circumferential wall, an external surface tangentially of which said supporting surface extends and a part of its eye form which depends below said body, and said body having at its underside at least one integral flange extending from side to side of said body longitudinally of said band and joined to said depending part of at least one of said hinge portions, and said hinge portions presented by said modules in each said transverse row at one side of said row being spaced apart by distances complementary to the widths, that is the dimensions measured transversely of said band, of said hinge portions presented by said modules at the opposite side of said transverse row, said hinge portions of said modules in each said transverse row intercalating with, and engaging the same transverse rod members as, said hinge portions of said modules in adjacent transverse rows, and said hinge portions which engage with each said transverse rod member defining in effect in combination a continuous sleeve which covers said transverse rod member across the width of said band.

7. A load-bearing component for an endless conveyor band, comprising a moulded plastics module having a perforate body of generally tabular form comprising a series of spaced bar portions defining slots therebetween and extending between two opposite sides of said body and which bar portions together present a flat supporting surface of said body, and integral with and projecting from said opposite sides of said body spaced hinge portions of eye form partially over which said bar portions and slots extend, said hinge portions each having an imperforate circumferential wall, an external surface tangentially of which said supporting surface extends and a part of its eye form which depends below said body, and said hinge portions at each of said opposite sides of said body being spaced apart by distances complementary to the widths, that is the dimensions parallel to said body sides, of said hinge portions at the other side of said body, and said body having at its underside at least one integral flange extending transversely of said opposite sides and joined to said depending part of at least one of said hinge portions.

8. An endless conveyor band constructed of spaced transverse rod members and load-bearing components extending between and hingedly connected to said rod members, wherein said load-bearing components are moulded plastic modules disposed in transverse rows across said band there being a plurality of said modules in each said transverse row, each module has a rectangular shaped body part with a series of spaced parallel bars with open slots therebetween defining a grate-like appearance, spaced eye portions constituting hinged portions integral with and projecting from opposite sides of said body lengthwise of said band through which said rod members extend, one end of said slots extending over the eye portion of the hinge to the top of the curvature of the cylindrical surface defining the eye portion, the opposite end of said slots terminating in a wall portion of said body part interposed between adjacent bars with the upper surface of said wall portion being beveled whereby said slots are longer at the top surface of said body part than at the bottom surface, said hinged portions of each said module having integral depending parts extending below said body part, and said body part of each said module has at its underside at least one integral depending stiffening flange extending from side to side of said body longitudinally of said band and joined to said depending part of at least one of said hinged portions, said hinged portions of said modules in each said transverse row intercalating with and engaging the same transverse rod members as said hinged portions of said modules in adjacent transverse rows, and said hinged portions which engage with each said transverse rod member defining in effect in combination a continuous sleeve which covers said transverse rod member across the width of said band.

* * * * *

UNITED STATES PATENT OFFICE
CERTIFICATE OF CORRECTION

Patent No. 3,774,752  Dated November 27, 1973

Inventor(s) GEORGE ARTHUR HARVEY

It is certified that error appears in the above-identified patent and that said Letters Patent are hereby corrected as shown below:

Column 1, line 44 "modulated" should read ---moulded---'

Column 7, line 16 "plane common" should be deleted and ---the--- inserted;

Column 7, line 31, "generaly" should read ---generally---.

Signed and sealed this 30th day of July 1974.

(SEAL)
Attest:

McCOY M. GIBSON, JR.
Attesting Officer

C. MARSHALL DANN
Commissioner of Patents